(12) United States Patent
Choi et al.

(10) Patent No.: US 9,918,063 B2
(45) Date of Patent: Mar. 13, 2018

(54) MULTIVIEW VIDEO ENCODING METHOD AND DEVICE, AND MULTIVIEW VIDEO DECODING METHOD AND DEVICE

(71) Applicant: SAMSUNG ELECTRONICS CO., LTD., Suwon-si (KR)

(72) Inventors: Byeong-doo Choi, Siheung-si (KR); Jae-hyun Kim, Seoul (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 475 days.

(21) Appl. No.: 14/522,131

(22) Filed: Oct. 23, 2014

(65) Prior Publication Data
US 2015/0043657 A1    Feb. 12, 2015

Related U.S. Application Data

(63) Continuation of application No. PCT/KR2013/003470, filed on Apr. 23, 2013.
(Continued)

(51) Int. Cl.
*H04N 19/159* (2014.01)
*H04N 19/503* (2014.01)
(Continued)

(52) U.S. Cl.
CPC ......... *H04N 13/0003* (2013.01); *H04N 19/46* (2014.11); *H04N 19/597* (2014.11);
(Continued)

(58) Field of Classification Search
CPC .. H04N 19/597; H04N 19/52; H04N 13/0048; H04N 19/70; H04N 19/46;
(Continued)

(56) References Cited

U.S. PATENT DOCUMENTS 9,565,449 B2 * 2/2017 Chen ................... H04N 19/597
2012/0147137 A1   6/2012 Jeon et al.
(Continued)

FOREIGN PATENT DOCUMENTS

KR          10-0996364 B1    11/2010
KR     10-2011-0036520 A      4/2011
(Continued)

OTHER PUBLICATIONS

Communication dated Aug. 28, 2013, issued by the International Searching Authority in counterpart International Application No. PCT/KR2013/003470.

*Primary Examiner* — Nathnael Aynalem
(74) *Attorney, Agent, or Firm* — Sughrue Mion, PLLC

(57) ABSTRACT

Provided are methods and apparatuses for encoding and decoding a multiview video. The method of decoding the multiview video includes obtaining a data unit including encoding information of texture pictures and depth map pictures of a multiview image related to a same point of time, obtaining, from the data unit, view information of pictures that are encoded and are included in the data unit, type information indicating a type of each of the pictures from among the texture pictures and the depth map pictures, and reference flag information indicating whether each of the pictures is previously inter-layer predicted by referring to a texture picture of the same point of time or to a depth map picture of the same point of time, determining an encoding order of the pictures, based on the obtained information, and decoding the texture pictures and depth map pictures based on the determined encoding order.

11 Claims, 20 Drawing Sheets

Related U.S. Application Data

(60) Provisional application No. 61/636,896, filed on Apr. 23, 2012.

(51) Int. Cl.
*H04N 13/00* (2018.01)
*H04N 19/597* (2014.01)
*H04N 19/46* (2014.01)
*H04N 19/105* (2014.01)
*H04N 19/172* (2014.01)
*H04N 19/96* (2014.01)
*H04N 19/136* (2014.01)

(52) U.S. Cl.
CPC .......... *H04N 19/105* (2014.11); *H04N 19/136* (2014.11); *H04N 19/172* (2014.11); *H04N 19/96* (2014.11)

(58) Field of Classification Search
CPC ...... H04N 19/61; H04N 19/105; H04N 19/51; H04N 19/172; H04N 19/176; H04N 19/30; H04N 19/159; H04N 19/33; H04N 19/503

USPC ........................................ 375/240.01–240.29
See application file for complete search history.

(56) References Cited

U.S. PATENT DOCUMENTS

| | | |
|---|---|---|
| 2012/0207211 A1 | 8/2012 | Song et al. |
| 2012/0229602 A1* | 9/2012 | Chen .................... H04N 19/597 348/43 |
| 2013/0038686 A1* | 2/2013 | Chen .................... H04N 19/597 348/43 |
| 2013/0064292 A1 | 3/2013 | Song et al. |
| 2013/0128965 A1* | 5/2013 | Zhang .................... H04N 19/00 375/240.12 |

FOREIGN PATENT DOCUMENTS

| | | |
|---|---|---|
| KR | 10-2011-0126485 A | 11/2011 |
| KR | 10-1099261 B1 | 12/2011 |
| KR | 10-2012-0027193 A | 3/2012 |

\* cited by examiner

FIG. 7
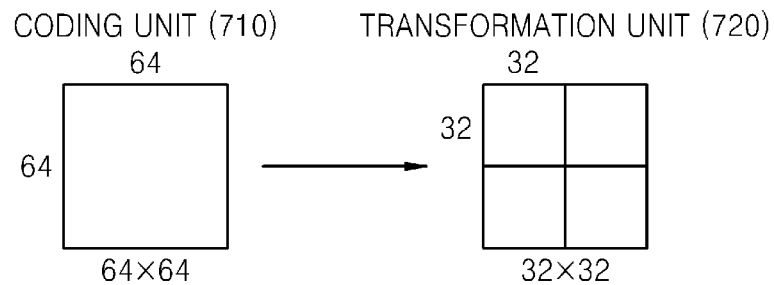
FIG. 8
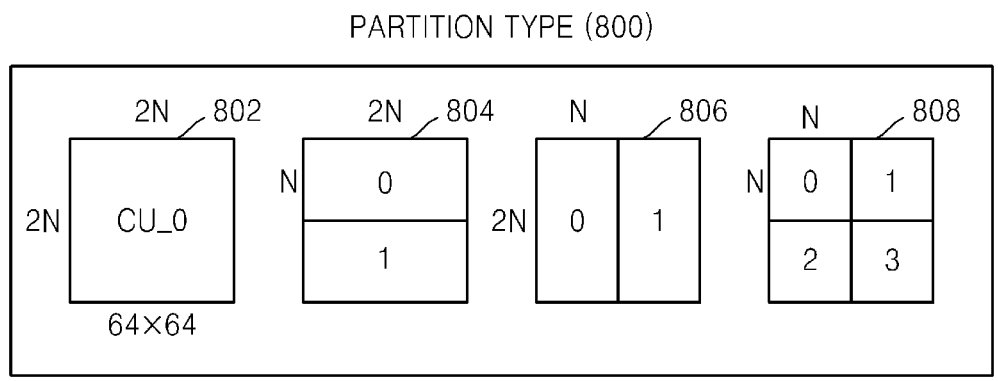
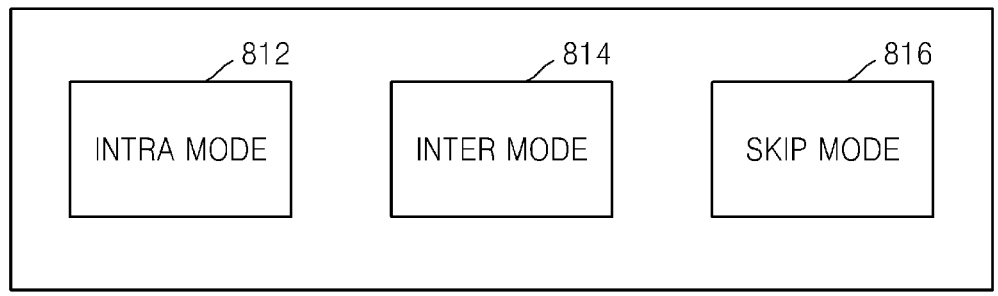
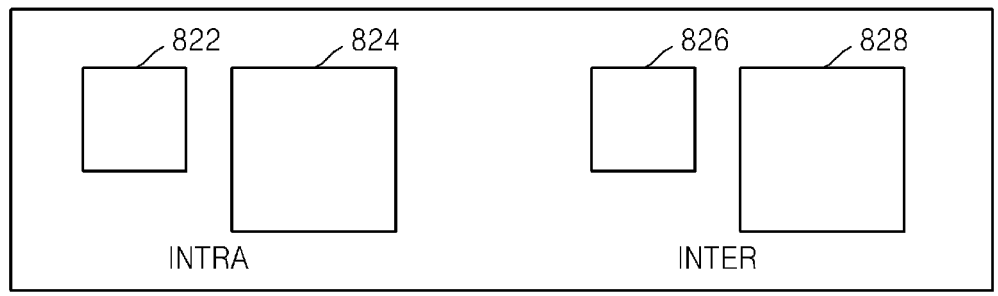

CODING UNIT (1010)

FIG. 20

| access_unit_delimiter_rbsp( ) { | Descriptor |
|---|---|
| pic_type | u(3) |
| 2010 — picture_coding_order_update_flag | u(1) |
| If ( picture_coding_order_update_flag ) | |
| picture_coding_order_update() | |
| rbsp_trailing_bits( ) | |
| } | |

FIG. 21

| picture_coding_order_update ( ) { | Descriptor |
|---|---|
| 2110 — num_layer_current_minus1 | ue(v) |
| If ( num_layer_current_minus1 ) | |
| for( i = 0; i <= num_layer_current_minus1 ) { | |
| 2120 — view_id[ i ] | ue(v) |
| 2130 — depth_flag[ i ] | u(1) |
| If( depth_flag ) | |
| 2140 — texture_to_depth_dependent_flag | u(1) |
| else | |
| 2150 — depth_to_texture_dependent_flag | u(1) |
| } | |
| } | | ns
MULTIVIEW VIDEO ENCODING METHOD AND DEVICE, AND MULTIVIEW VIDEO DECODING METHOD AND DEVICE

CROSS-REFERENCE TO RELATED APPLICATIONS

This application is a continuation application of International Application No. PCT/KR2013/003470, filed on Apr. 23, 2013, which claims priority to U.S. provisional patent application No. 61/636,896, filed on Apr. 23, 2012 in the U.S. Patent and Trademark Office, the entire disclosures of which are incorporated herein by reference in their entirety.

TECHNICAL FIELD

The exemplary embodiments relate to methods and apparatuses for encoding and decoding a video, and more particularly, to a multiview video high level syntax structure for signaling an encoding order and an inter-layer prediction relation between pictures that construct a multiview video.

BACKGROUND OF THE RELATED ART

Recently, due to development in digital image processing and computer graphic technologies, research for a three-dimensional (3D) video technology and a multiview video technology that reproduce a real world image and allow a realistic experience of the reproduction have been actively performed. A 3D television (TV) using a multiview video can provide a user with a realistic feeling due to contents reconstructed from a real world, and thus is promoted as a next-generation broadcasting technology. A 3D video coding system has a multiview video support function so as to enable a user to freely change a view of the video which the user is watching or to enable the multiview video to be reproduced in various types of a 3D reproducing apparatus. However, since a data amount is increased in the multiview video, there is a demand for an efficient coding method of decreasing the data amount of the multiview video.

SUMMARY

The exemplary embodiments provide a high level syntax structure for efficiently signaling an encoding order of a texture picture and a depth map picture that construct a multiview video and an inter-layer prediction relation between pictures that construct the multiview video.

Also, the exemplary embodiments provide a method and apparatus for efficiently encoding a multiview video and a method and apparatus for efficiently decoding the multiview video by using a high level syntax structure.

The exemplary embodiments further provide a technique of signaling an encoding order and an inter-layer prediction relation between pictures of an access unit that construct a multiview video.

According to an aspect of an exemplary embodiment, there is provided a method of decoding a multiview video, the method including: obtaining, from a bitstream, a data unit including encoding information of texture pictures and depth map pictures of a multiview image, the texture pictures and the depth map pictures being related to a same point of time; obtaining, from the data unit, view information of pictures that are encoded and are included in the data unit, type information indicating a type of each of the pictures from among the texture pictures and the depth map pictures, and reference flag information indicating whether each of the pictures is previously inter-layer predicted by referring to a texture picture of the same point of time or to a depth map picture of the same point of time; determining an encoding order of the pictures included in the data unit, based on the view information, the type information, and the reference flag information of each of the pictures; and decoding the texture pictures and the depth map pictures, based on the determined encoding order.

The type information may be flag information that indicates whether each of the pictures is the depth map picture, and if each of the pictures is the depth map picture, the obtaining of the reference flag information may include obtaining the reference flag information indicating whether each of the pictures is previously inter-layer predicted by referring to a texture picture of the same point of time, and if each of the pictures is the texture picture, the obtaining of the reference flag information may include obtaining the reference flag information indicating whether each of the pictures is previously inter-layer predicted by referring to a depth map picture of the same point of time.

The method may further include obtaining, from the data unit, update flag information indicating whether to update the encoding order of the pictures included in the data unit, and wherein, when the update flag information indicates to update the encoding order of the pictures included in the data unit, the determining of the encoding order of the pictures included in the data unit includes determining the encoding order of the pictures included in the data unit, based on the view information, the type information, and the reference flag information of each of the pictures, and when the update flag information indicates not to update the encoding order of the pictures included in the data unit, the determining of the encoding order of the pictures included in the data unit includes determining the encoding order of the pictures included in the data unit, based on an encoding order that is determined in a previous data unit previous to the data unit.

The data unit may be an access unit.

The texture pictures and the depth map pictures of the multiview image may be encoded based on coding units of a tree structure that are obtained by hierarchically splitting a maximum coding unit.

The texture pictures and the depth map pictures of the multiview image related to the same point of time may have a same picture order count (POC).

According to another aspect of an exemplary embodiment, there is provided a multiview video decoding apparatus, including: a parser configured to obtain, from a bitstream, a data unit including encoding information of texture pictures and depth map pictures of a multiview image, the texture pictures and the depth map pictures being related to a same point of time, and to obtain, from the data unit, view information of pictures that are encoded and are included in the data unit, type information indicating a type of each of the pictures from among the texture pictures and the depth map pictures, and reference flag information indicating whether each of the pictures is previously inter-layer predicted by referring to a texture picture of the same point of time or to a depth map picture of the same point of time; and a multiview image decoder configured to determine an encoding order of the pictures included in the data unit, based on the view information, the type information, and the reference flag information of each of the pictures, and to decode the texture pictures and the depth map pictures, based on the determined encoding order.

The type information may be flag information that indicates whether each of the pictures is the depth map picture, and wherein, if each of the pictures is the depth map picture, the parser may be configured to obtain the reference flag information indicating whether each of the pictures is previously inter-layer predicted by referring to a texture picture of the same point of time, and if each of the pictures is a texture picture, the parser may be configured to obtain the reference flag information indicating whether each of the pictures is previously inter-layer predicted by referring to a depth map picture of the same point of time.

The parser may be configured to obtain, from the data unit, update flag information indicating whether to update the encoding order of the pictures included in the data unit, and wherein, when the update flag information indicates to update the encoding order of the pictures included in the data unit, the multiview image decoder may be configured to determine the encoding order of the pictures included in the data unit, based on the view information, the type information, and the reference flag information of each of the pictures, and when the update flag information indicates not to update the encoding order of the pictures included in the data unit, the multiview image decoder may be configured to determine the encoding order of the pictures included in the data unit, based on an encoding order that is previously determined in a previous data unit previous to the data unit.

The data unit may be an access unit.

The texture pictures and the depth map pictures of the multiview image may be pictures that are encoded based on coding units of a tree structure that are obtained by hierarchically splitting a maximum coding unit.

The texture pictures and the depth map pictures of the multiview image related to the same point of time may have a same picture order count (POC).

According to another aspect of an exemplary embodiment, there is provided a method of encoding a multiview video, including: encoding texture pictures and depth map pictures of a multiview image, the texture pictures and the depth map pictures being related to a same point of time, by selectively applying different encoding orders and inter-layer prediction; comparing encoding costs according to use of the different encoding orders and the inter-layer prediction, and thereby determining an encoding order having an optimal encoding cost among the different encoding orders and determining whether each of the texture pictures and the depth map pictures is an inter-layer prediction picture that is encoded by the inter-layer prediction; and based on a result of the determining, applying, to a data unit, view information of pictures that are encoded and are included in the data unit, type information indicating a type of each of the pictures from among the texture pictures and the depth map pictures, and reference flag information indicating whether each of the pictures is previously inter-layer predicted, wherein the data unit includes encoding information of the texture pictures and the depth map pictures.

According to another aspect of an exemplary embodiment, there is provided a multiview video encoding apparatus, including: a multiview image encoder configured to encode texture pictures and depth map pictures of a multiview image, the texture pictures and the depth map pictures being related to a same point of time, by selectively applying different encoding orders and inter-layer prediction, to compare encoding costs according to use of the different encoding orders and the inter-layer prediction, and thereby determine an encoding order having an optimal encoding cost among the different encoding orders and to determine whether each of the texture pictures and the depth map pictures is an inter-layer prediction picture that is encoded by the inter-layer prediction; and an outputter configured to apply, based on a result of the determination, to a predetermined data unit, view information of pictures that are encoded and are included in the data unit, type information indicating a type of each of the pictures from among the texture pictures and the depth map pictures, and reference flag information indicating whether each of the pictures is previously inter-layer predicted, wherein the data unit includes encoding information of the texture pictures and the depth map pictures.

According to another aspect of an exemplary embodiment, there is provided a non-transitory computer-readable recording medium having recorded thereon a program for executing the method of decoding a multiview video according to an aspect of an exemplary embodiment.

According to another aspect of an exemplary embodiment, there is provided a non-transitory computer-readable recording medium having recorded thereon a program for executing the method of encoding a multiview video according to another aspect of an exemplary embodiment.

According to the exemplary embodiments, an encoding order and an inter-layer prediction relation between pictures of an access unit that construct a multiview video are signaled, so that a decoder may determine interdependence and an encoding order of a plurality of pieces of encoded data included in a bitstream and thus may efficiently decode the plurality of pieces of encoded data of the multiview video.

BRIEF DESCRIPTION OF THE DRAWINGS

FIG. 7 is a diagram for describing a relationship between a coding unit and transformation units, according to an exemplary embodiment;

FIG. 8 illustrates a plurality of pieces of encoding information according to depths, according to an exemplary embodiment;

FIG. 20 illustrates an example of an access unit (AU) delimiter, according to an exemplary embodiment;

FIG. 21 illustrates an example of picture_coding_order_update( ) shown in FIG. 20;

DETAILED DESCRIPTION OF THE EXEMPLARY EMBODIMENTS

Hereinafter, a video encoding technique and a video decoding technique based on coding units of a tree structure, according to exemplary embodiments, will be described with reference to FIGS. 1 through 13. Also, a multiview video encoding technique and a multiview video decoding technique based on coding units of a tree structure, according to exemplary embodiments, will be described with reference to FIGS. 14 through 24.

First, the video encoding technique and the video decoding technique based on coding units of a tree structure will be described with reference to FIGS. 1 through 13.

Figure 1:
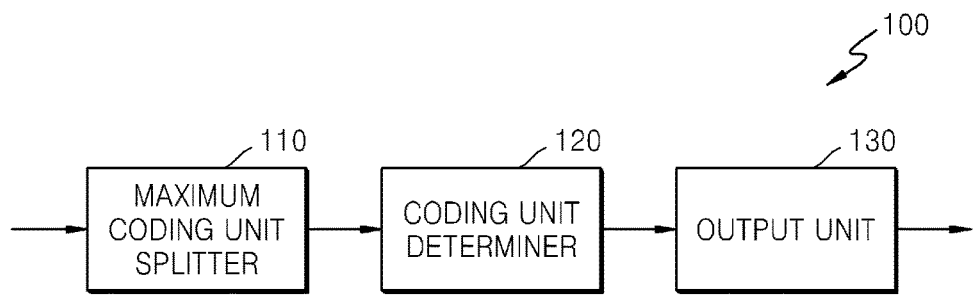
FIG. 1 is a block diagram of a video encoding apparatus based on coding units of a tree structure, according to an exemplary embodiment.

FIG. 1 is a block diagram of a video encoding apparatus based on coding units of a tree structure 100, according to an exemplary embodiment. The video encoding apparatus which is configured to encode data using video prediction based on coding units of the tree structure 100 includes a maximum coding unit splitter 110, a coding unit determiner 120, and an output unit 130. Hereinafter, for convenience of description, the video encoding apparatus which is configured to encode data using video prediction based on coding units of the tree structure 100 may be referred to as 'video encoding apparatus 100'.

The maximum coding unit splitter 110 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units which are generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, e.g., based on a coding unit that is no longer split into coding units corresponding to a lower depth. Hereinafter, the coding unit that is no longer split and becomes a basis unit for prediction encoding may also be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit or partition, and a transformation unit, according to exemplary embodiments, will be described in detail later with reference to FIGS. 3 through 13.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, information about the partition type in the prediction unit, information about the prediction mode, and information about the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment may be a square data unit obtained by splitting the minimum coding unit constituting the lowermost depth by 4. Alternatively, the minimum unit according to an exemplary embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, information about a reference image index of the inter mode, information about a motion vector, information about a chroma component of an intra mode, and information about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information, which are described above with reference to FIGS. 1 through 6.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
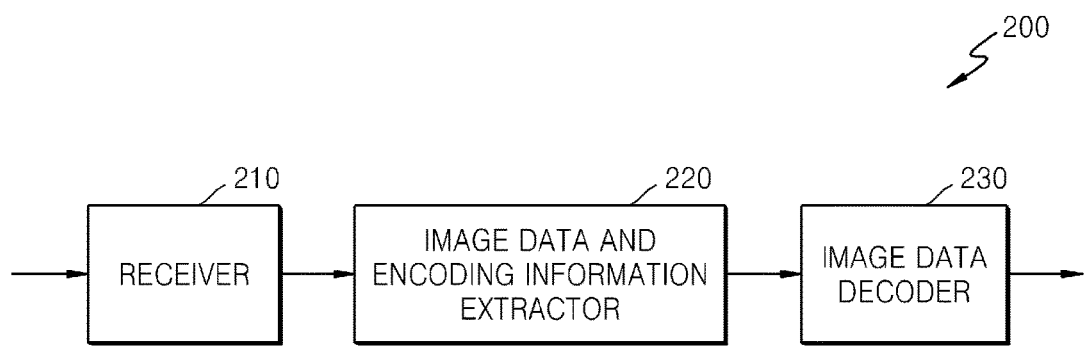
FIG. 2 is a block diagram of a video decoding apparatus based on coding units of a tree structure, according to an exemplary embodiment.

FIG. 2 is a block diagram of a video decoding apparatus based on coding units of a tree structure 200, according to an exemplary embodiment.

The video decoding apparatus which is configured to decode video using video prediction based on coding units of the tree structure 200 includes a receiver 210, an image data and encoding information extractor 220, and an image data decoder 230. Hereinafter, for convenience of description, the video decoding apparatus which is configured to decode video using video prediction based on coding units of the tree structure 200 may be referred to as 'video decoding apparatus 200'.

Definitions of various terms, such as a coding unit, a depth, a prediction unit, a transformation unit, and information about various encoding modes, for decoding operations of the video decoding apparatus 200 may be identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be restored.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 3:
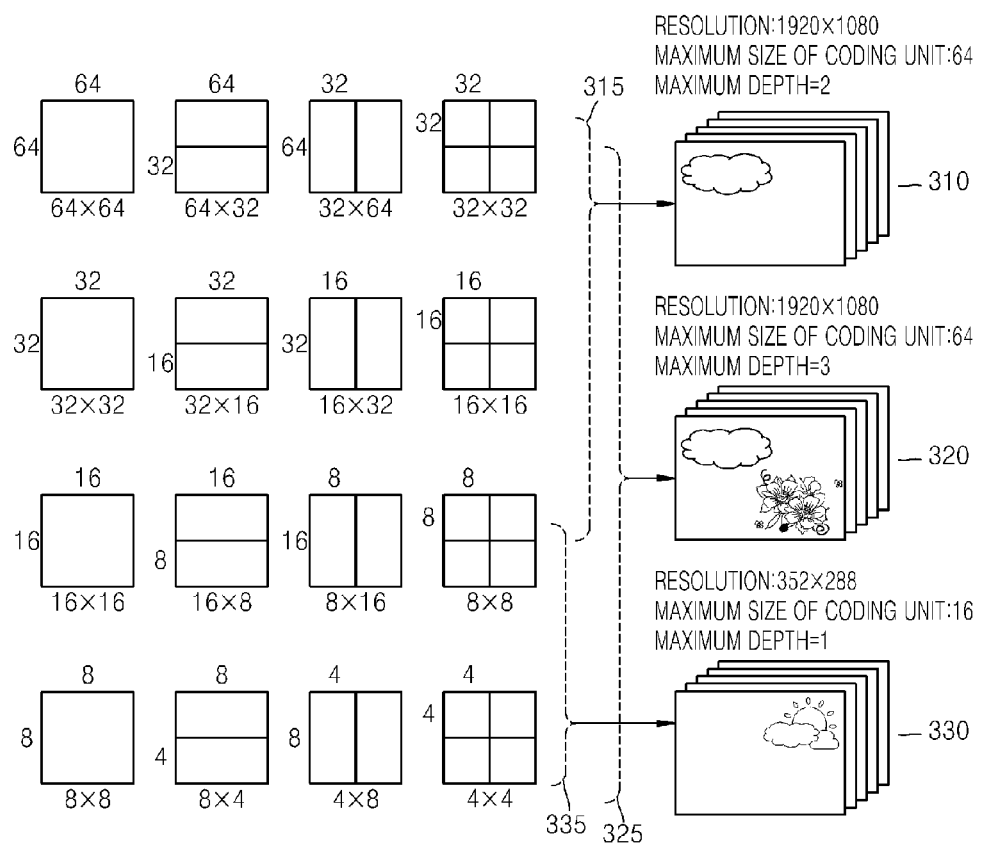
FIG. 3 is a diagram for describing a concept of coding units according to an exemplary embodiment.

FIG. 3 is a diagram for describing a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. On the other hand, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
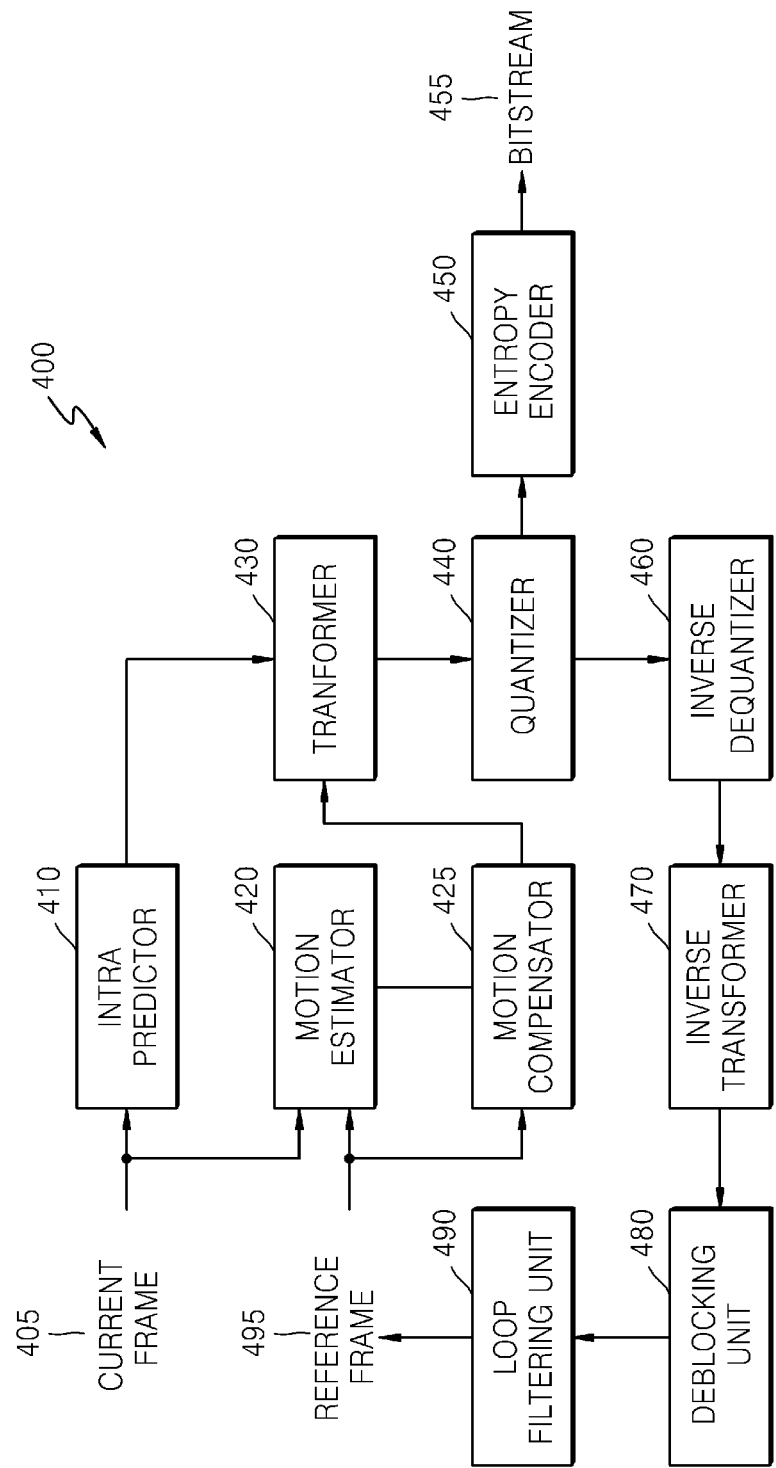
FIG. 4 is a block diagram of an image encoder based on coding units, according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse dequantizer 460 and an inverse transformer 470, and the restored data in the spatial domain is output as the reference frame 495 after being post-processed through a deblocking unit 480 and an offset adjusting unit 490 (e.g., loop filtering unit). The quantized transformation coefficient may be output as a bitstream 455 through an entropy encoder 450.

In order for the image encoder 400 to be implemented in the video encoding apparatus 100, all elements of the image encoder 400, e.g., the intra predictor 410, the motion estimator 420, the motion compensator 425, the transformer 430, the quantizer 440, the entropy encoder 450, the inverse dequantizer 460, the inverse transformer 470, the deblocking unit 480, and the offset adjusting unit 490 perform operations based on each coding unit among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
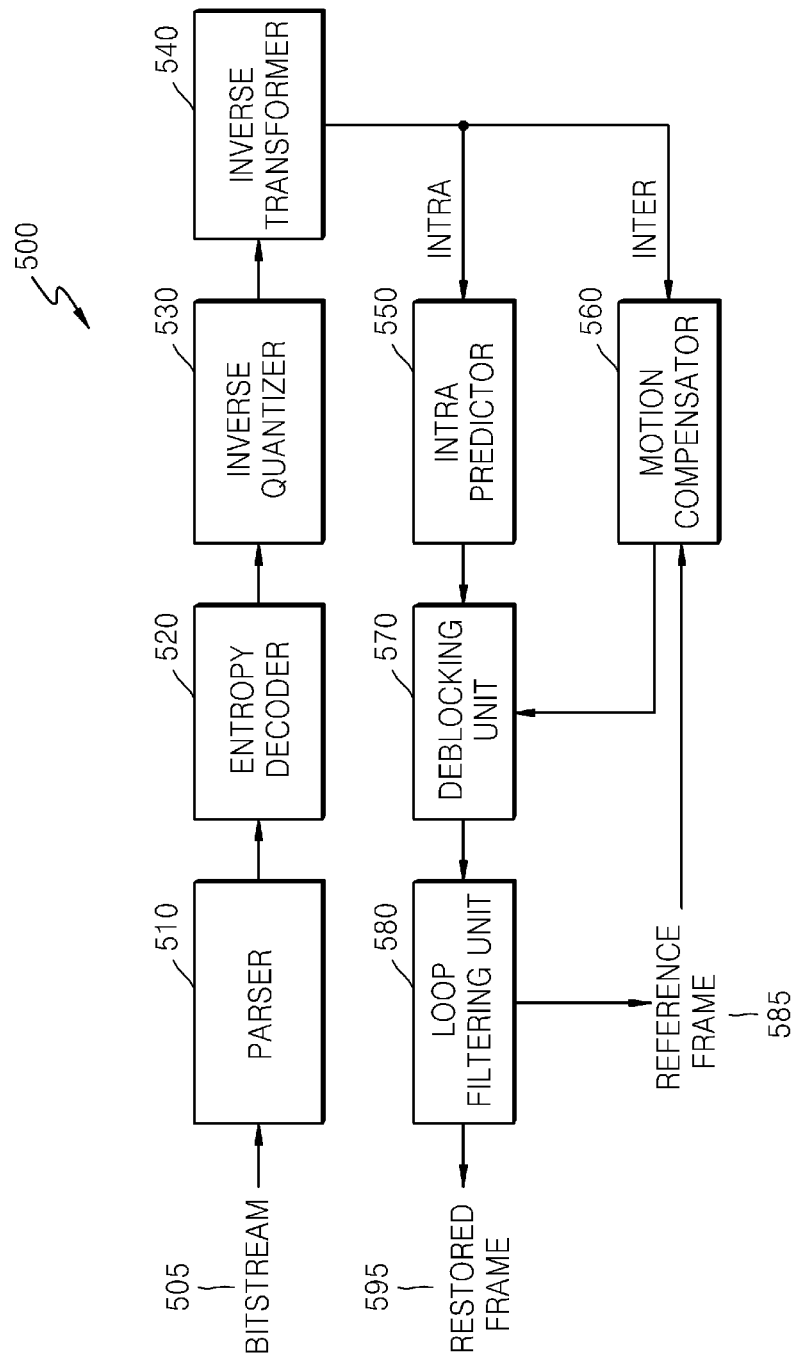
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and an offset adjusting unit 580 (e.g., loop filtering unit). Also, the image data that is post-processed through the deblocking unit 570 and the offset adjusting unit 580 may be output as the reference frame 585.

In order to decode the image data in the image data decoder 230 of the video decoding apparatus 200, the image decoder 500 may perform operations that are performed after the parser 510.

In order for the image decoder 500 to be implemented in the video decoding apparatus 200, all elements of the image decoder 500, e.g., the parser 510, the entropy decoder 520, the inverse quantizer 530, the inverse transformer 540, the intra predictor 550, the motion compensator 560, the deblocking unit 570, and the offset adjusting unit 580 perform operations based on coding units having a tree structure for each maximum coding unit.

Specifically, the intra predictor 550 and the motion compensator 560 have to determine partitions and a prediction mode for each of the coding units having a tree structure, and the inverse transformer 540 has to determine a size of a transformation unit for each coding unit.

Figure 6:
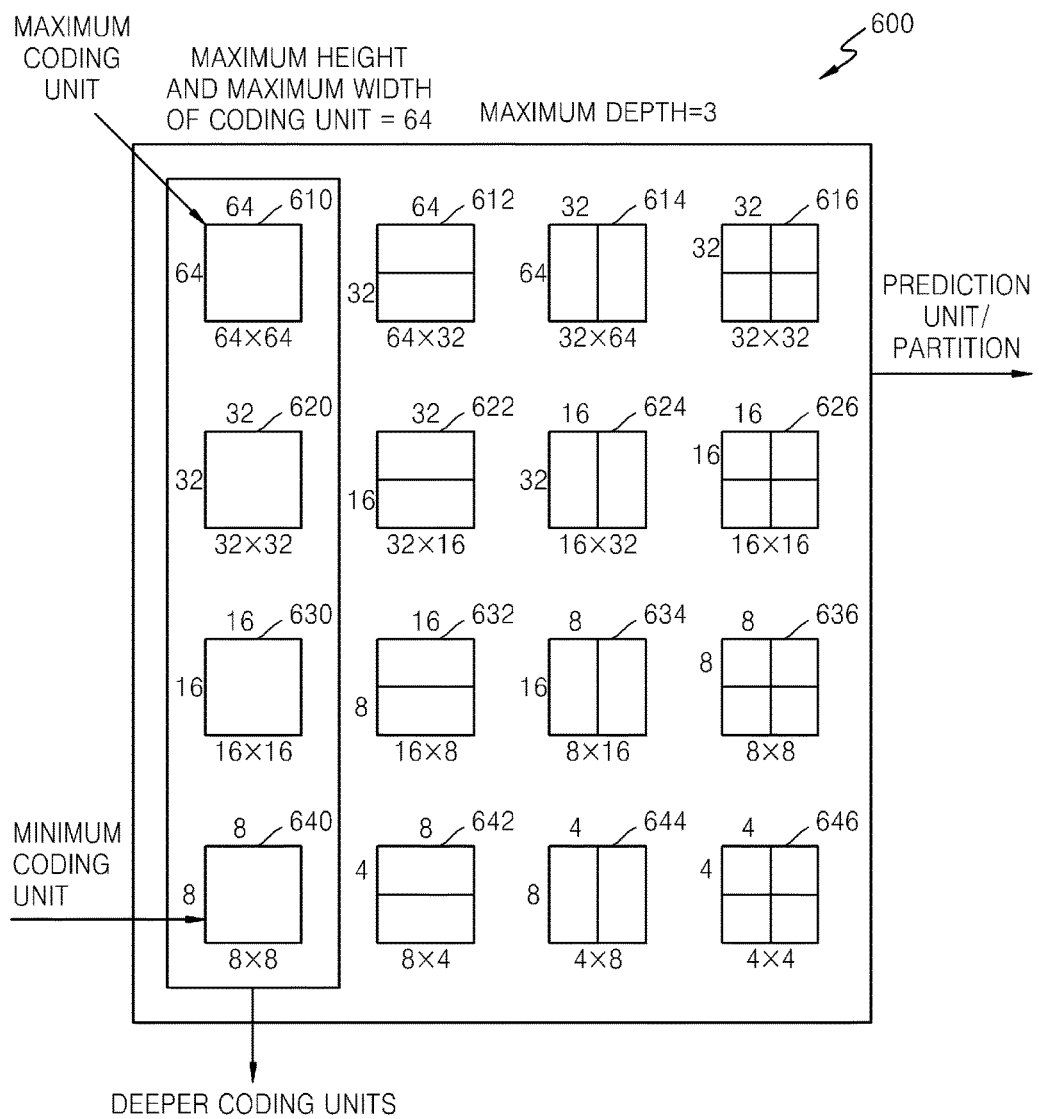
FIG. 6 is a diagram illustrating deeper coding units according to depths, and partitions, according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, the maximum depth refers to a total number of times the coding unit is split from the maximum coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, e.g., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are provided. The coding unit 640 having the size of 8×8 and the depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, e.g., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, e.g., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, e.g., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, e.g., a partition having a size of 8×8 included in the coding unit 640, partitions 642 having a size of 8×4, partitions 644 having a size of 4×8, and partitions 646 having a size of 4×4.

Lastly, the coding unit 640 having the size of 8×8 and the depth of 3 is a minimum coding unit having a lowermost depth.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error that is a representative encoding error may be selected for the current depth by performing encoding for each prediction unit in the coding units corresponding to the current depth, along the horizontal axis of the hierarchical structure 600. Alternatively, the minimum encoding error may be searched for by comparing representative encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 illustrates a plurality of pieces of encoding information according to depths, according to an exemplary embodiment n.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 810 indicates a prediction mode of each partition. For example, the information 810 may indicate a mode of prediction encoding performed on a partition indicated by the information 800, e.g., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 9:
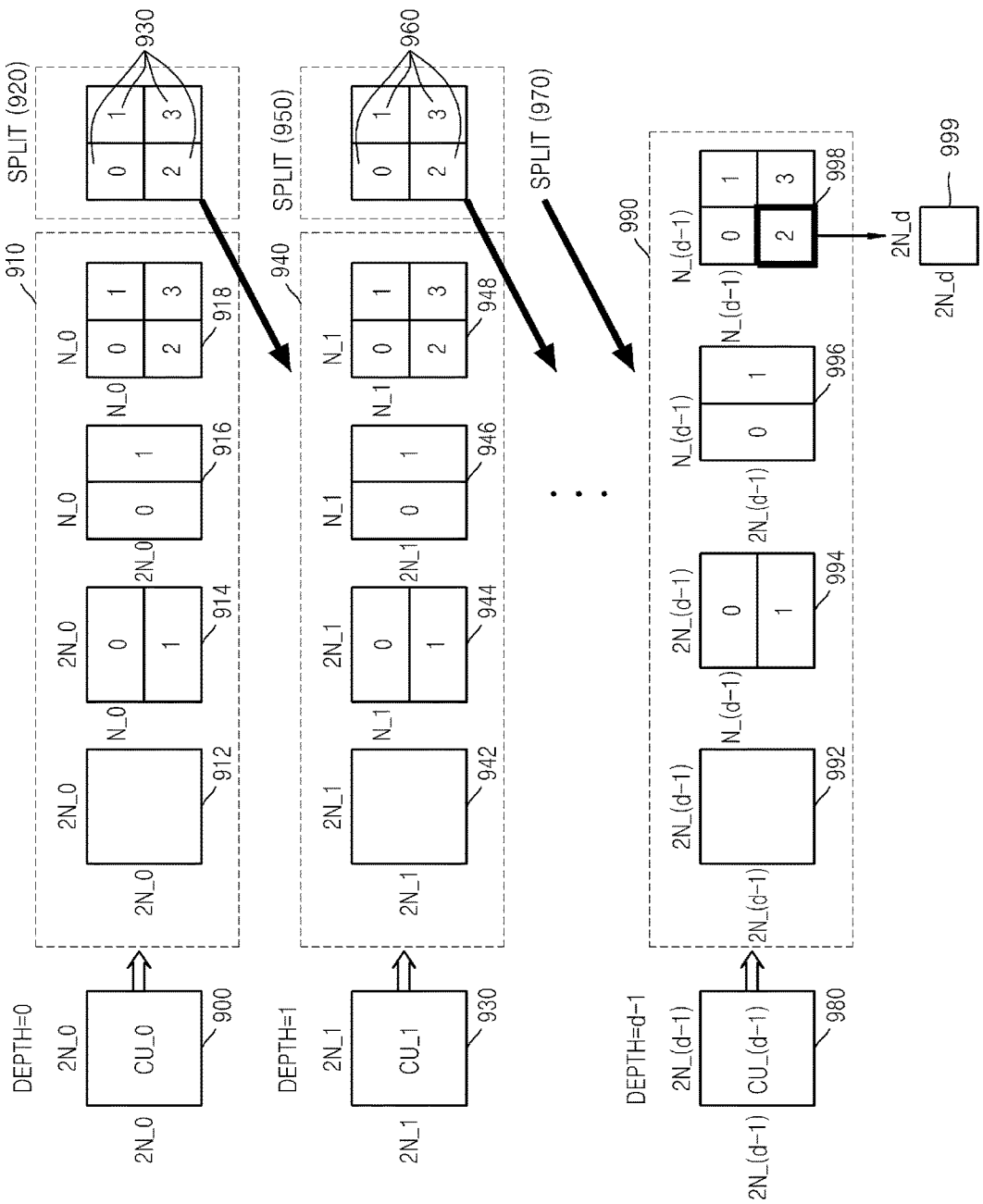
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition types to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a square data unit obtained by splitting a minimum coding unit 980 having a lowermost coded depth by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0, 1, . . . , d−1, d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
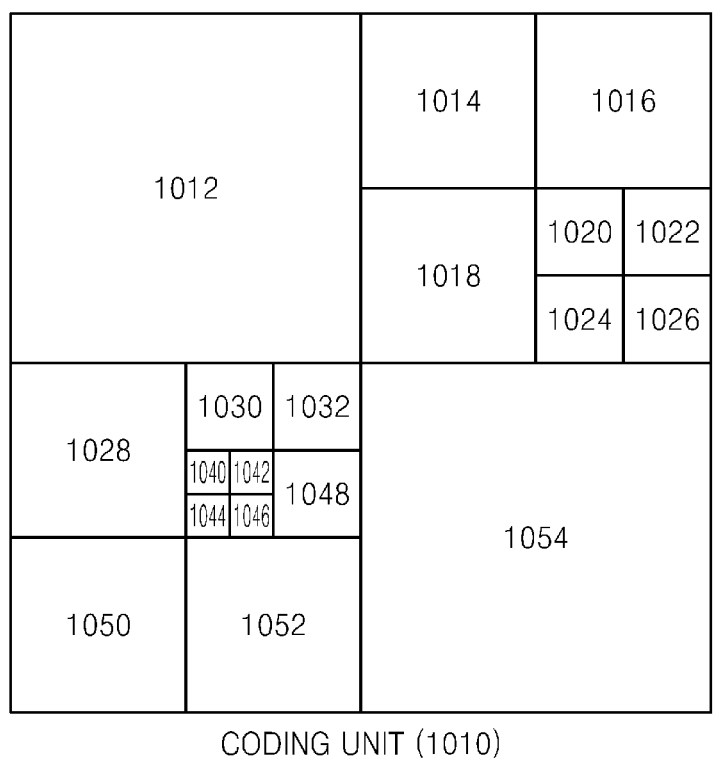
FIGS. 10, 11, and 12 are diagrams for describing a relationship between coding units, prediction units, and transformation units, according to an exemplary embodiment.
Figure 11:
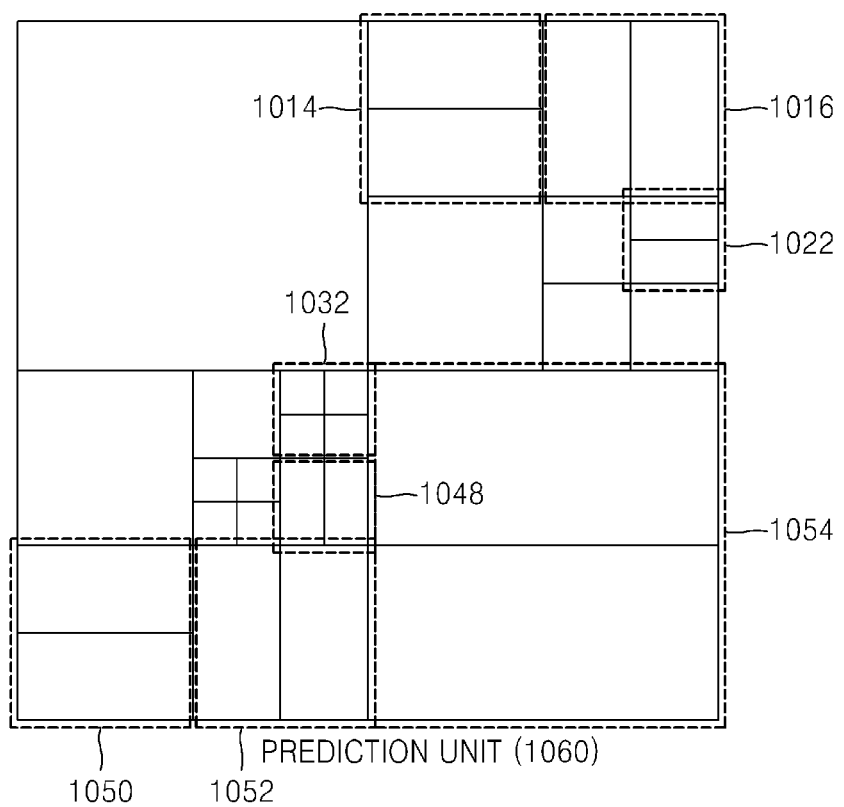
Figure 12:
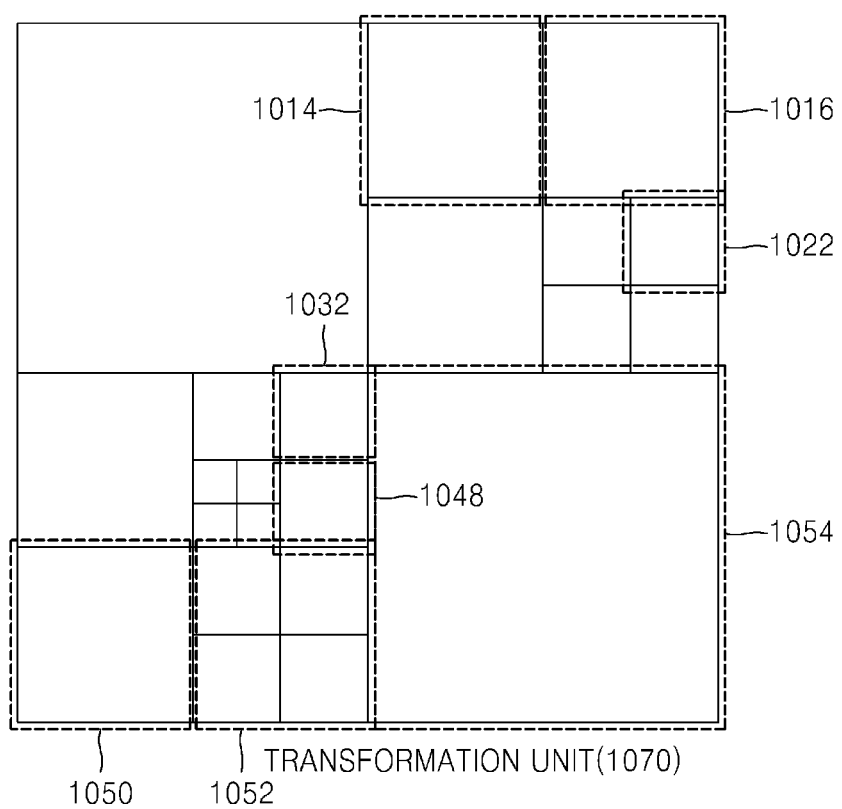

FIGS. 10, 11, and 12 are diagrams for describing a relationship between coding units 1010, prediction units 1060, and transformation units 1070, according to an exemplary embodiment.

The coding units 1010 are deeper coding units according to depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of the coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | Split Information 0 (Encoding on Coding Unit having Size of 2Nx2N and Current Depth of d) | | | | | Split Information 1 |
|---|---|---|---|---|---|---|
| | | | Size of Transformation Unit | | | |
| Prediction Mode | Partition Type | | Split Information 0 of Transformation Unit | Split Information 1 of Transformation Unit | | |
| | Symmetrical Partition Type | Asymmetrical Partition Type | | | | |
| Intra Inter Skip (Only | 2Nx2N 2NxN Nx2N NxN | 2NxnU 2NxnD nLx2N nRx2N | 2Nx 2N | NxN (Symmetrical Partition Type) | | Repeatedly Encode Coding Units |

TABLE 1-continued

Split Information 0
(Encoding on Coding Unit having
Size of 2Nx2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| 2Nx2N) | | | | N/2xN/2 (Asymmetrical Partition Type) | having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1 ratios, and the asymmetrical partition types having the sizes of nL×2N and nR×2N may be respectively obtained by splitting the width of the prediction unit in 1:3 and 3:1 ratios.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
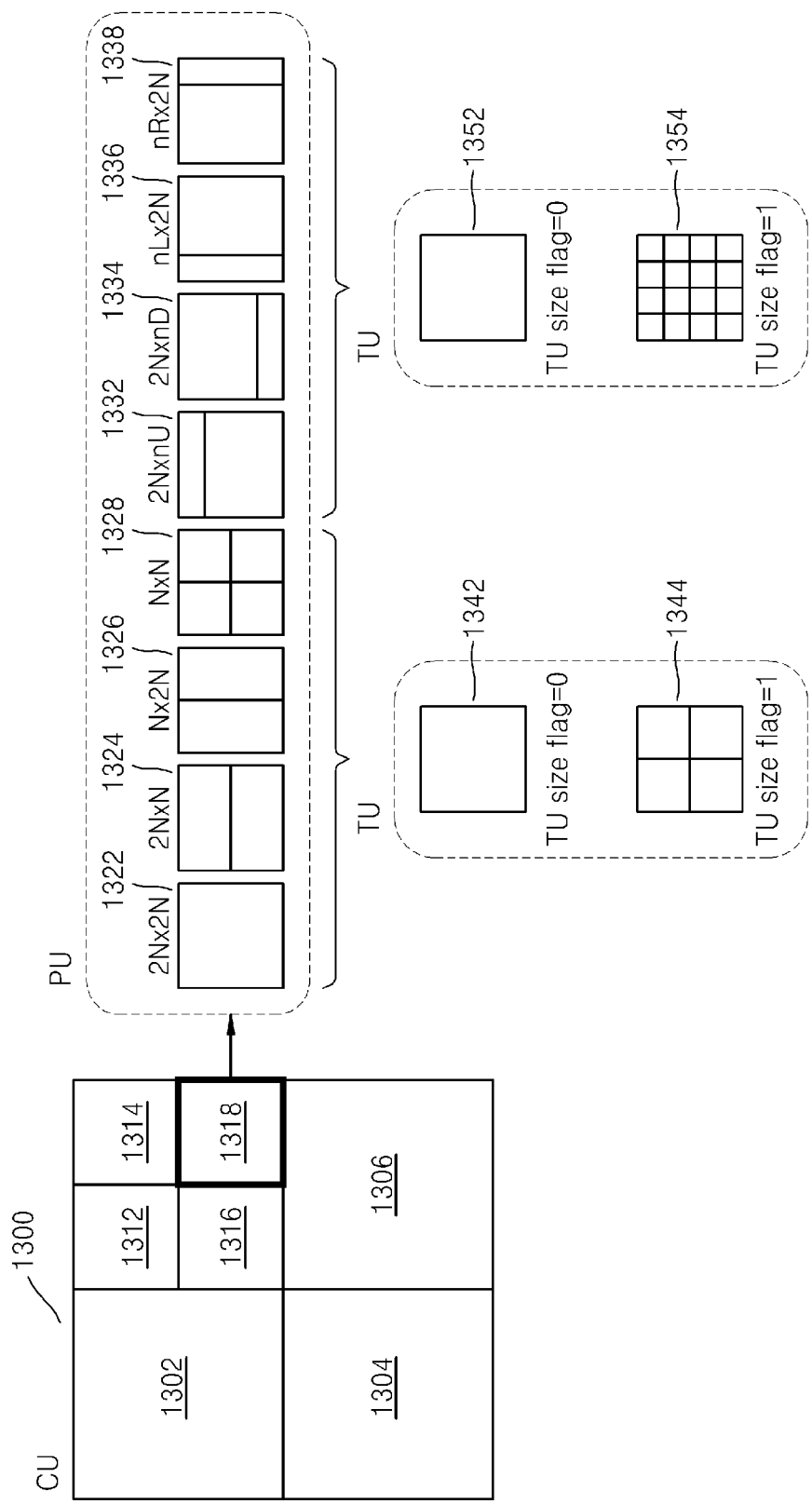
FIG. 13 is a diagram for describing a relationship between a coding unit, a prediction unit, and a transformation unit, according to encoding mode information of Table 1.

FIG. 13 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, e.g., the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, e.g., the partition type 1332 having the size of 2N×nU, the partition type 1334 having the size of 2N×nD, the partition type 1336 having the size of nL×2N, or the partition type 1338 having the size of nR×2N, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, but the TU size flag is not limited to a flag having 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\wedge}\text{MaxTransformSizeIndex})) \quad \text{Equation (1)}$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad \text{Equation (2)}$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad \text{Equation (3)}$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the exemplary embodiments are not limited thereto.

The maximum coding unit that includes coding units of the tree structure described above with reference to FIGS. 1 through 13 may be variously referred as a coding block tree, a block tree, a root block tree, a coding tree, a coding root, or a tree trunk.

Hereinafter, a multiview video encoding technique and a multiview video decoding technique based on coding units of a tree structure will now be described with reference to FIGS. 14 through 24.

Figure 14:
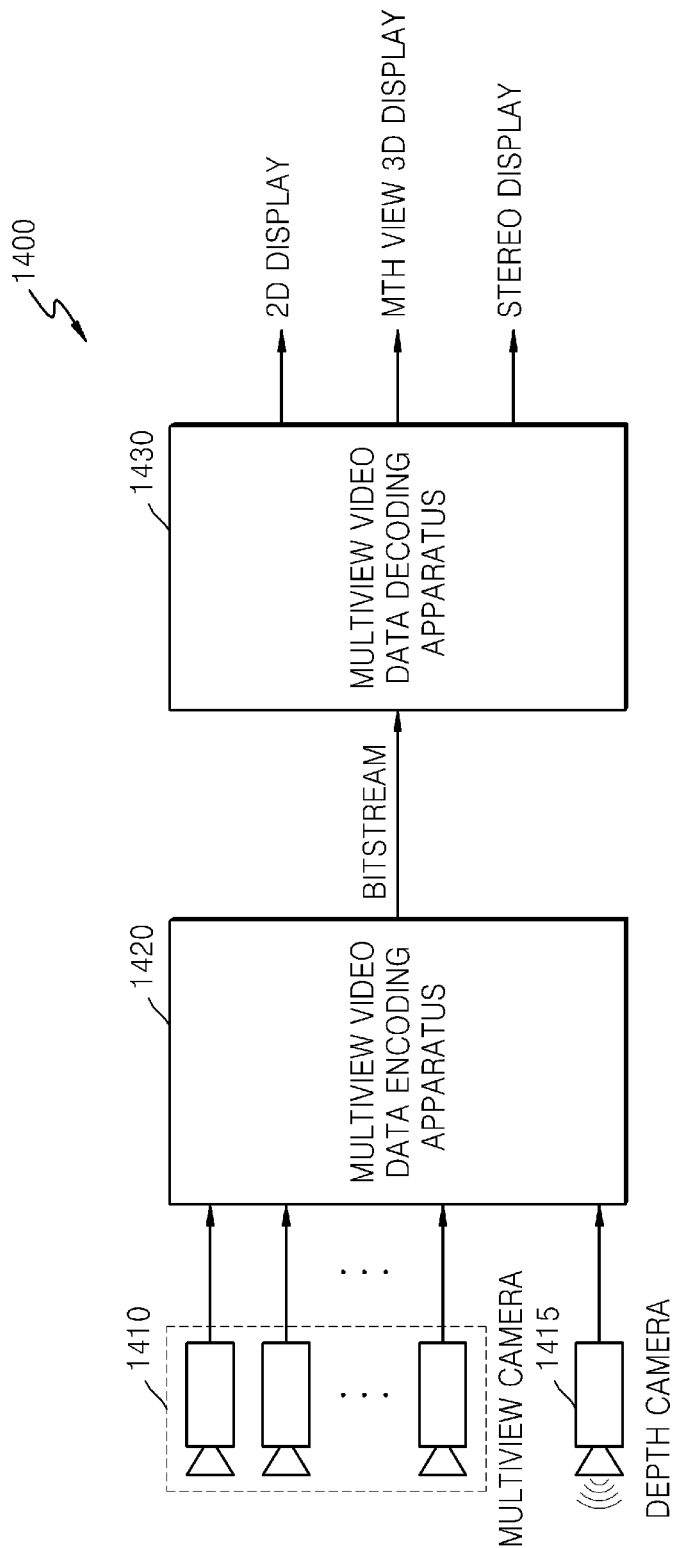
FIG. 14 illustrates a multiview video system, according to an exemplary embodiment.

FIG. 14 illustrates a multiview video system 1400, according to an exemplary embodiment.

The multiview video system 1400 includes a multiview video data encoding apparatus 1420 and a multiview video data decoding apparatus 1430, wherein the multiview video data encoding apparatus 1420 generates a bitstream by encoding a multiview video image obtained by using two or more multiview video cameras 1410, and a depth map image of the multiview video image that is obtained by using a depth camera 1415, and the multiview video data decoding apparatus 1430 that decodes the bitstream and provides a decoded multiview video frame in various forms according to a viewer's demand.

The multiview video cameras 1410 are formed of a plurality of cameras having different views and provide a multiview video image for every frame. The depth camera 1415 provides a depth map image that expresses, as an 8-bit image of 256 levels, depth information of a scene. The depth camera 1415 may measure a distance between a camera and an object and background by using infrared rays, etc., and may provide a depth map image having a value that is proportional or inversely proportional to the distance. In this manner, an image of a view includes a texture image and a depth map image. The texture image may indicate an image including a pixel value according to each of YUV color components.

When the multiview video data encoding apparatus 1420 encodes and transmits a depth map image that corresponds to a multiview texture image, the multiview video data decoding apparatus 1430 may provide a stereoscopic effect via an existing stereo image or a three-dimensional (3D) image and may also synthesize a 3D image having a viewer-desired view and may provide the 3D image, by using the multiview texture image and the depth map image included in a bitstream.

Since an amount of encoded data of multiview video data increases in proportion to the number of views, and the depth map image for realizing the stereoscopic effect has to be encoded, it may be necessary to efficiently compress a large amount of the multiview video data so as to implement the multiview video system shown in FIG. 14.

Figure 15:
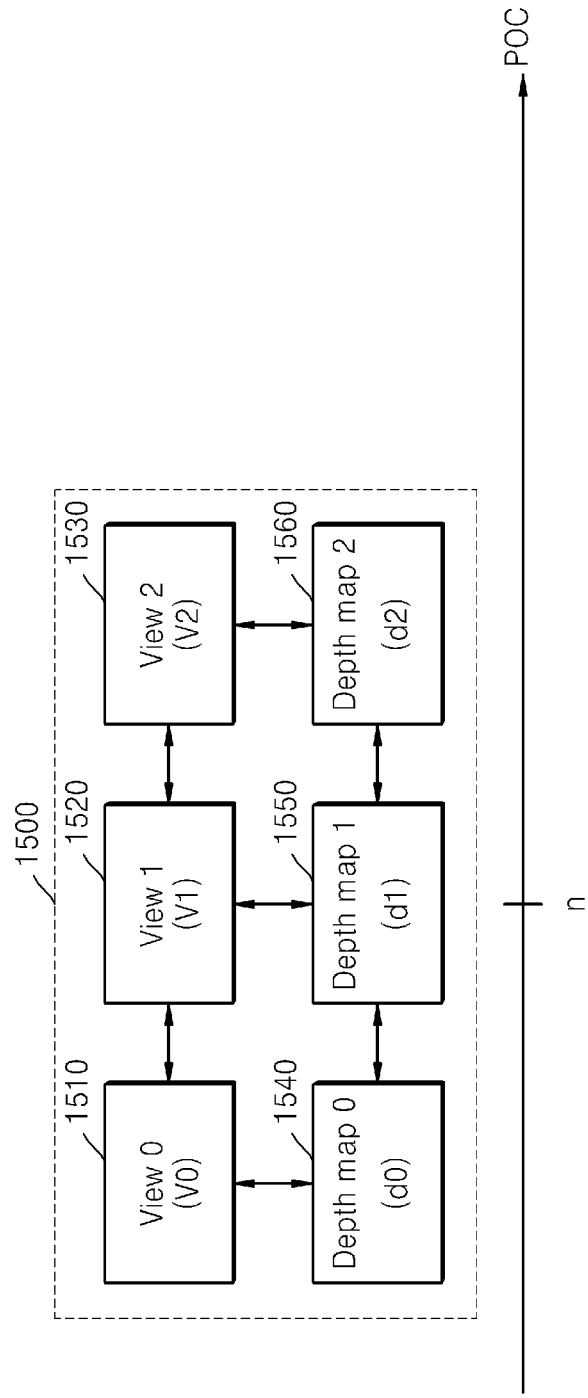
FIG. 15 illustrates texture images and depth map images that construct a multiview image.

FIG. 15 illustrates texture images and depth map images that construct a multiview image.

FIG. 15 illustrates a texture picture v0 1510 having a first view View 0, a depth map picture d0 1540 that corresponds to the texture picture v0 1510 having the first view View 0, a texture picture v1 1520 having a second view View 1, a depth map picture d1 1550 that corresponds to the texture picture v1 1520 having the second view View 1, a texture picture v2 1530 having a third view View 2, and a depth map picture d2 1560 that corresponds to the texture picture v2 1530 having the third view View 2. While FIG. 15 illustrates the multiview texture pictures v0 1510, v1 1520, and v2 1530 having three views View 0, View 1, and View 1, respectively, and the depth map pictures d0 1540, d1 1550, and d2 1560 corresponding thereto, the number of views is not limited thereto and may vary. The multiview texture pictures v0 1510, v1 1520, and v2 1530 and the depth map pictures d0 1540, d1 1550, and d2 1560 corresponding thereto are input at a same point of time and thus have the same picture order count (POC). Hereinafter, a picture group 1500 having the same n (where n is an integer) POC value such as multiview texture pictures v0 1510, v1 1520, and v2 1530 and the depth map pictures d0 1540, d1 1550, and d2 1560 corresponding thereto may be referred to as an nth picture group.

Since a texture image and a depth map image of the same view respectively express a color and a depth of an image of the same view, a correlation may be present therebetween. That is, a predetermined correlation may be present between the texture image and the depth map image corresponding thereto. Also, a predetermined correlation may be present between texture images or depth map images that have different views and are input at the same point of time. Thus, when the multiview video data encoding apparatus 1420 according to an exemplary embodiment encodes pictures in the picture group 1500, the multiview video data encoding apparatus 1420 may perform inter-layer prediction so as to predict another picture from at least one picture, in consideration of the correlation. That is, when each of the multiview texture images and depth map images in one picture group is defined as one layer, the multiview video data encoding apparatus 1420 may prediction-encode an image of a current layer by referring to a previous layer.

Figure 16:
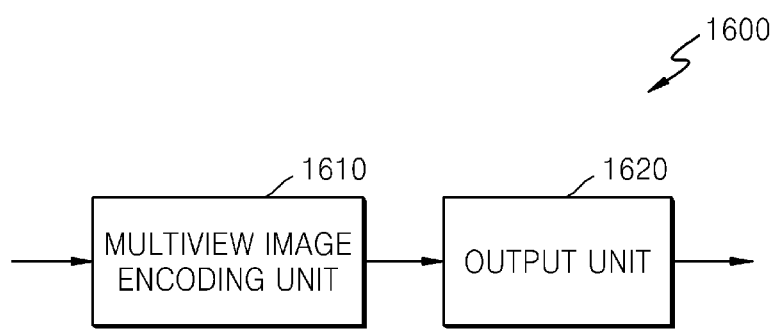
FIG. 16 is a block diagram illustrating a configuration of a multiview video encoding apparatus, according to an exemplary embodiment.

FIG. 16 is a block diagram illustrating a configuration of a multiview video encoding apparatus, according to an exemplary embodiment.

Referring to FIG. 16, a multiview video encoding apparatus 1600 includes a multiview image encoding unit 1610 (e.g., multiview image encoder) and an output unit 1620 (e.g., outputter).

The multiview image encoding unit 1610 encodes the texture pictures and the depth map pictures that are included in a group by selectively applying different encoding orders and inter-layer prediction to texture pictures and depth map pictures that are included in the group. For example, referring back to FIG. 15, the multiview image encoding unit 1610 may encode the multiview texture pictures v0 1510, v1 1520, and v2 1530 and the depth map pictures d0 1540, d1 1550, and d2 1560 corresponding thereto included in the picture group 1500 while the multiview image encoding unit 1610 changes encoding orders, and may determine an encoding order that has an optimal encoding cost. A rate distortion (RD) cost may be used as the encoding cost. For example, the multiview image encoding unit 1610 may compare an encoding cost according to a result of encoding the six pictures included in the picture group 1500 in an order of v0, d0, v1, d1, v2, and d2 with an encoding cost according to a result of encoding the six pictures included in the picture group 1500 in an order of v1, d1, v0, d0, v2, and d2, and may determine an optimal encoding order. The optimal encoding order may be determined by comparing encoding costs according to encoding results based on all usable encoding orders.

If n pictures are included in a picture group, the multiview image encoding unit 1610 may encode the pictures in the picture group according to nPn encoding orders. As the number of pictures included in the picture group increases, calculations so as to determine an optimal encoding order also increase, so that the multiview image encoding unit 1610 may encode the pictures in the picture group according to a predetermined total number of encoding orders according to a preset rule.

Also, the multiview image encoding unit 1610 may determine whether to perform the inter-layer prediction and then to predict each picture by referring to a previous picture or whether to independently prediction-encode each picture, wherein the inter-layer prediction involves prediction-encoding a next picture by referring to the previous picture that is first encoded according to an encoding order and then is restored. For example, if it is assumed that the six pictures included in the picture group 1500 of FIG. 15 are encoded in an order of v0, d0, v1, d1, v2, and d2, the multiview image encoding unit 1610 may compare an encoding cost of prediction-encoding the picture d0 by referring to the previous picture v0 with an encoding cost of independently prediction-encoding the picture d0 without referring to the previous picture v0, and may determine whether to encode the picture d0 by using the inter-layer prediction. The multiview image encoding unit 1610 may compare an encoding cost of using the inter-layer prediction by referring to a previous picture with an encoding cost of separately encoding each picture without referring to a previous picture, and may determine whether to use the inter-layer prediction for each picture, based on encoding costs of all pictures, except for an initial picture, in a picture group.

When the multiview image encoding unit 1610 determines an encoding order of pictures in a picture group, the output unit 1620 adds, to an access unit, encoding information of each of the pictures in an order according to the encoding order. Also, the output unit 1620 adds view information of each of the pictures, type information indicating a type of each picture from among the texture picture and the depth map picture, and reference flag information indicating whether each picture was inter-layer predicted.

Figure 17:
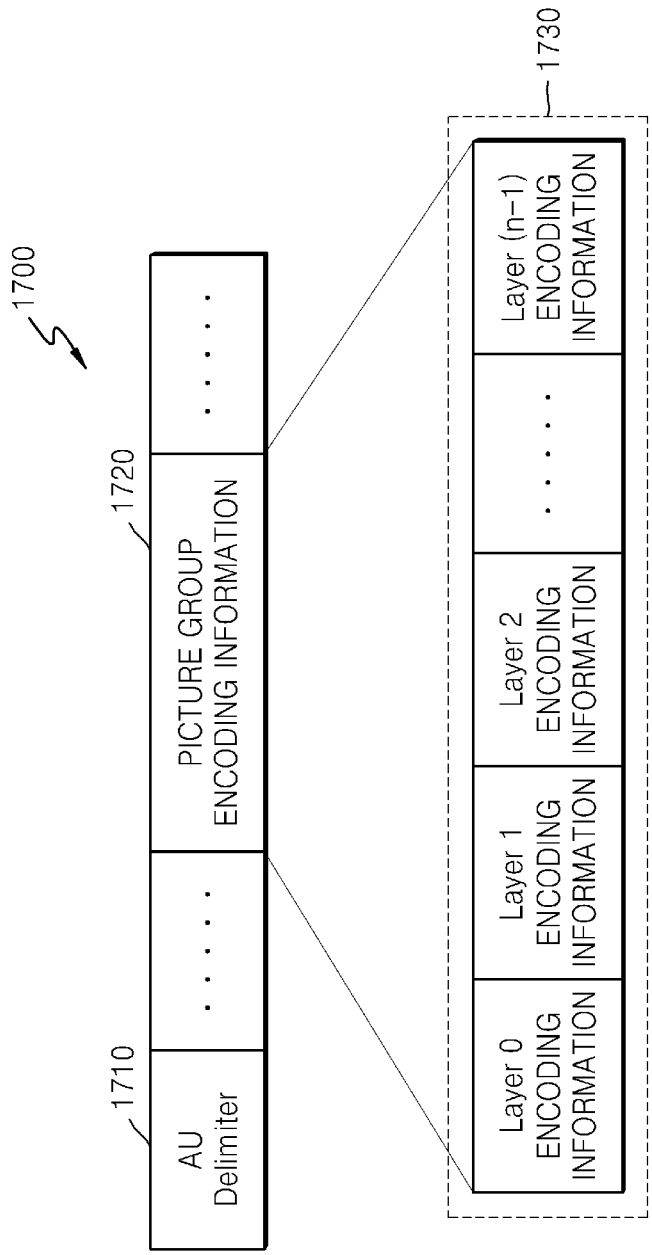
FIG. 17 illustrates an access unit, according to an exemplary embodiment.

FIG. 17 illustrates an access unit, according to an exemplary embodiment.

Referring to FIG. 17, a picture group that is a group of pictures related to a same point of time is transmitted via an access unit 1700. The access unit 1700 includes an access unit delimiter (AU delimiter) 1710 and picture group encoding information 1720 that is encoding information of each of the pictures in the picture group. The picture group encoding information 1720 includes a plurality of pieces of encoding information of the pictures that are encoded according to an encoding order that was determined based on encoding costs. In a case where n pictures are included in a picture group and each of the multiview texture images and depth map images in the picture group is defined as one layer, the picture group encoding information 1720 includes a plurality of pieces of encoding information 1730 of layers that are encoded according to a determined encoding order. For example, if the six pictures included in the picture group 1500 of FIG. 15 are encoded in an order of v0, d0, v1, d1, v2, and d2, encoding information of the picture v0, encoding information of the picture d0, encoding information of the picture v1, encoding information of the picture d1, encoding information of the picture v2, and encoding information of the picture d2 are sequentially added to the picture group encoding information 1720, according to the encoding order.

The view information, type information, and reference flag information of each of the pictures included in the picture group encoding information 1720 are added to the AU delimiter 1710.

FIG. 20 illustrates an example of an AU delimiter, according to an exemplary embodiment.

Referring to FIG. 20, the AU delimiter includes a picture_coding_order_update_flag 2010 indicating whether to update an encoding order of pictures that are included in a current access unit. If the picture_coding_order_update_flag 2010 indicates 0, the encoding order of the pictures that are included in the current access unit is determined by using an encoding order of pictures that are included in a previous access unit. If the picture_coding_order_update_flag 2010 indicates 1, the encoding order of the pictures included in the current access unit is separately transmitted via picture_coding_order_update( ) without using the encoding order of the pictures that are included in the previous access unit.

Figure 18:
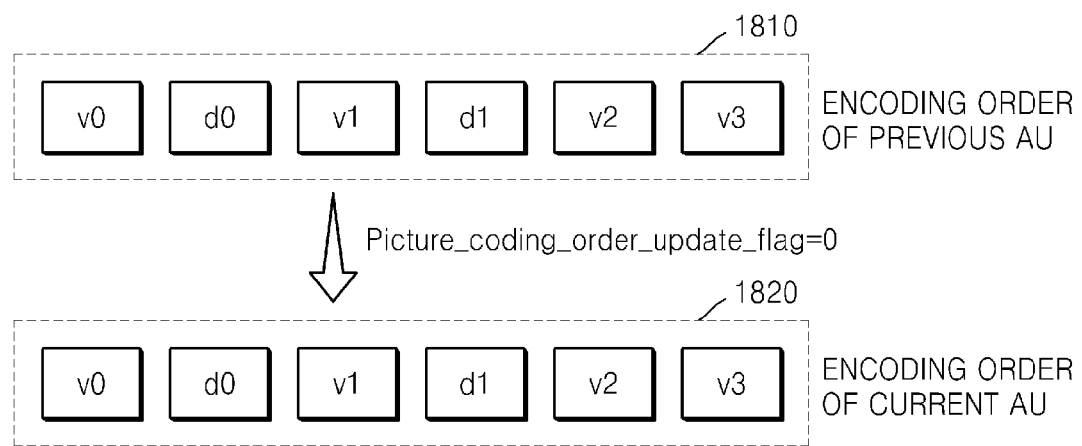
FIG. 18 illustrates an example in which an encoding order of pictures that are included in a previous access unit is used as an encoding order of pictures that are included in a current access unit.

FIG. 18 illustrates an example in which an encoding order of pictures that are included in a previous access unit is used as an encoding order of pictures that are included in a current access unit.

Referring to FIG. 18, when an encoding order of pictures 1810 included in a previous access unit is determined as v0, d0, v1, d1, v2, and v3, and an encoding order of pictures 1820 included in a current access unit is determined as v0, d0, v1, d1, v2, and v3, the output unit 1620 sets a picture_coding_order_update_flag as 0 and adds the picture_coding_order_update_flag to an AU delimiter. If the encoding order of the pictures that are included in the previous access unit is different from the encoding order of the pictures that are included in the current access unit, the output unit 1620 sets the picture_coding_order_update_flag as 1 and adds the picture_coding_order_update_flag to the AU delimiter.

FIG. 21 illustrates an example of picture_coding_order_update( ) shown in FIG. 20.

Referring to FIG. 21, when an encoding order of pictures that are included in a current access unit is newly transmitted, without using an encoding order of pictures that are included in a previous access unit, the output unit 1620 may enable an AU delimiter to include a num_layer_current_minus1 2110 that is information about the number of all of the pictures included in the current access unit.

The output unit 1620 adds, to the AU delimiter, view information view_id[i] 2120 of an ith picture of picture group encoding information of an access unit, type information depth_flag[i] 2130 indicating whether the ith picture is a depth map picture, and flag information (texture_to_depth_dependent_flag 2140 or depth_to_texture_dependent_flag 2150) indicating whether the ith picture was inter-layer predicted by referring to another picture. If the ith picture of the picture group encoding information of the access unit is the depth map picture, a reference flag (texture_to_depth_dependent_flag 2140) is set to indicate whether the depth map picture was inter-layer predicted by referring to a previous texture picture. If the texture_to_depth_dependent_flag 2140 indicates 1, the ith depth map picture indicates a picture that was inter-layer predicted by referring to the previous texture picture and if the texture_to_depth_dependent_flag 2140 indicates 0, the ith depth map picture indicates a picture that may be independently decoded without referring to the previous texture picture.

If the ith picture of the picture group encoding information of the access unit is a texture picture, a reference flag (depth_to_texture_dependent_flag 2150) is set to indicate whether the texture picture was inter-layer predicted by referring to a previous depth map picture. If the depth_to_texture_dependent_flag 2150 indicates 1, the ith texture picture indicates a picture that was inter-layer predicted by referring to the previous depth map picture, and if the depth_to_texture_dependent_flag 2150 indicates 0, the ith texture picture indicates a picture that may be independently decoded without referring to the previous depth map picture.

Figure 19:
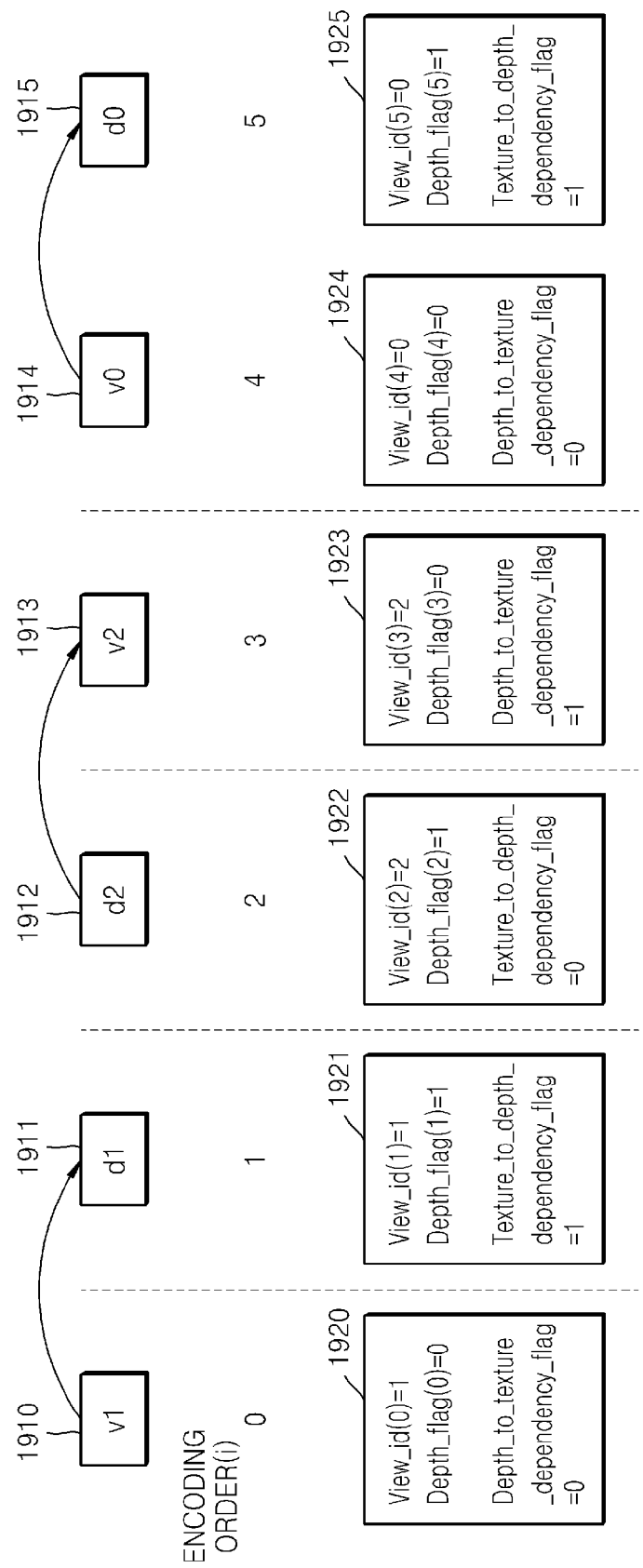
FIG. 19 illustrates an example of an encoding order of pictures in a picture group and information indicating whether each of the pictures is an inter-layer predicted picture, according to an exemplary embodiment.

FIG. 19 illustrates an example of an encoding order of pictures in a picture group and information indicating whether each of the pictures is an inter-layer predicted picture, according to an exemplary embodiment.

Referring to FIG. 19, it is assumed that the encoding order was determined in an order of v1, d1, d2, v2, v0, and d0 as illustrated. In FIG. 19, V# indicates a texture picture of # view, and d# indicates a depth map picture of # view. Also, it is assumed that inter-layer prediction was performed in an arrow direction as illustrated. For example, it is assumed that a d1 picture 1911 was inter-layer predicted by referring to a v1 picture 1910, a v2 picture 1913 was inter-layer predicted by referring to a d2 picture 1912, and a d0 picture 1915 was inter-layer predicted by referring to a v0 picture 1914.

The output unit 1620 adds, to an AU delimiter, view information of a picture that is ith (i is 0, 1, 2, 3, 4, 5) added to an access unit, type information of the picture, and reference flag information indicating whether the picture was inter-layer predicted. That is, the output unit 1620 adds, to the AU delimiter, view information view_id[i] of a picture that is ith encoded, and a flag (depth_flag[i]) indicating whether the ith encoded picture is a depth map picture. Also, if the ith encoded picture is the depth map picture, the output unit 1620 adds, to the AU delimiter, reference flag information (texture_to_depth_dependency_flag 2140) indicating whether the ith encoded picture was inter-layer predicted by referring to a previous texture picture. Also, if the ith encoded picture is a texture picture, the output unit 1620 adds, to the AU delimiter, reference flag information (depth_to_texture_dependency_flag 2150) indicating whether the ith encoded picture was inter-layer predicted by referring to a previous depth map picture.

For example, in a case of i=2, that is, regarding the d2 picture 1912 that is third encoded, since the d2 picture 1912 is an image of a second view, the output unit 1620 sets view_id(2)=2, and since the d2 picture 1912 is a depth map picture, the output unit 1620 sets Depth_flag(2)=1. Also, since the d2 picture 1912 does not refer to a previous texture picture, the output unit 1620 sets, as 0, reference flag information (texture_to_depth_dependency_flag 2140) indicating whether the d2 picture 1912 was inter-layer predicted by referring to the previous texture picture.

In this manner, when the encoding order of the pictures in the picture group is determined and whether the pictures were inter-layer predicted is determined, the output unit 1620 adds, to the AU Delimiter, a plurality of pieces of additional information 1920 through 1925 each including view information of each of the pictures that are ith encoded, type information of each picture, and reference flag information indicating whether each picture was inter-layer predicted, and outputs the plurality of pieces of additional information 1920 through 1925.

The reference flag information (texture_to_depth_dependency_flag 2140 or depth_to_texture_dependency_flag 2150) may not be included in the AU Delimiter, and may instead be added to a slice header.

A decoder may receive the plurality of pieces of additional information 1920 through 1925 each including the view information of each of the pictures that are ith encoded, the type information of each picture, and the reference flag information indicating whether each picture was inter-layer predicted, and may determine, based on the received information, an encoding order of pictures included in a current access unit, whether each of the pictures is a depth map picture or a texture picture, and whether each of the pictures was inter-layer predicted.

Figure 22:
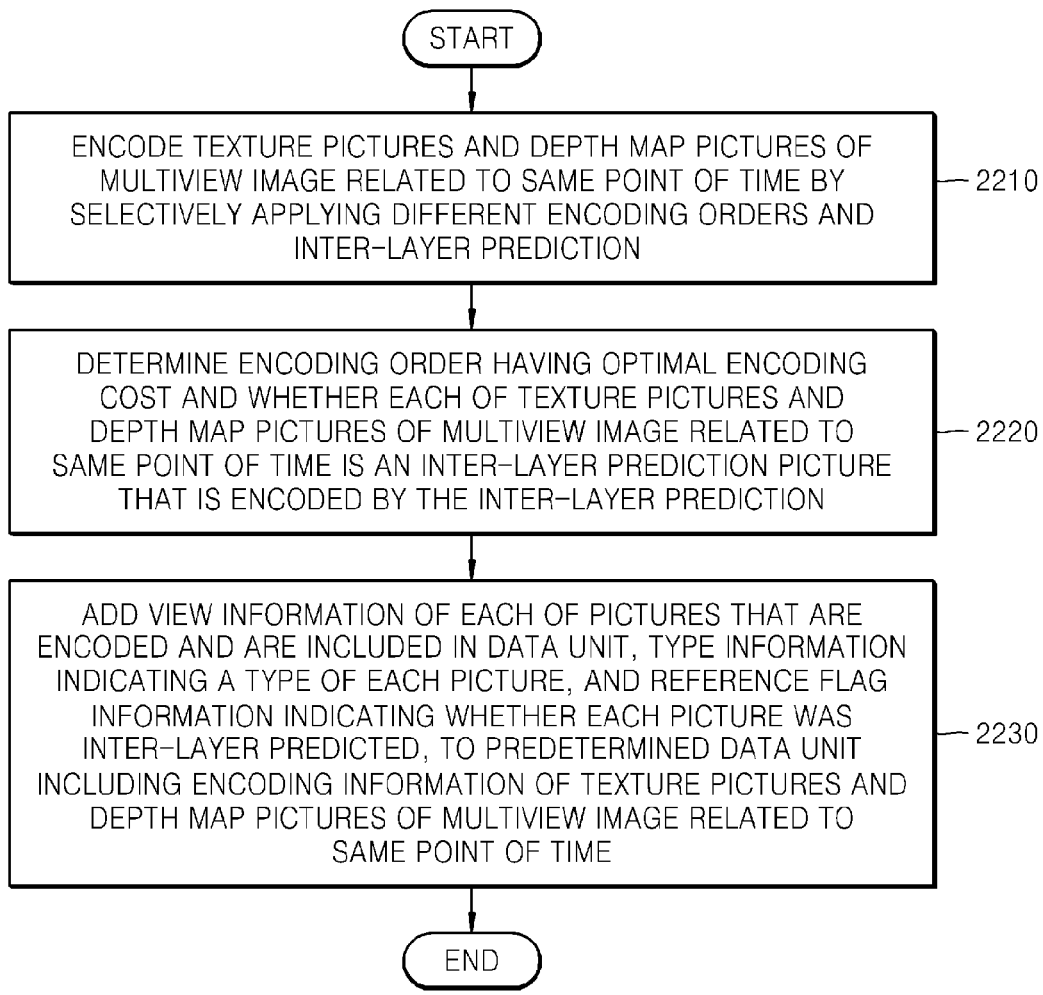
FIG. 22 is a flowchart of a method of encoding a multi-view video, according to an exemplary embodiment.

FIG. 22 is a flowchart of a method of encoding a multiview video, according to an exemplary embodiment.

Referring to FIG. 22, in operation 2210, the multiview image encoding unit 1610 encodes texture pictures and depth map pictures of a multiview image related to a same point of time by selectively applying different encoding orders and inter-layer prediction.

In operation 2220, the multiview image encoding unit 1610 compares encoding costs according to use of the different encoding orders and the inter-layer prediction, and determines an encoding order having an optimal encoding cost and whether each of the texture pictures and depth map pictures of the multiview image related to the same point of time is an inter-layer prediction picture that is encoded by the inter-layer prediction. As described above, the RD cost may be used as the encoding costs.

In operation 2230, the output unit 1620 adds view information of each of the pictures that are encoded and are included in a data unit, type information indicating a type of each picture from among the texture picture and the depth map picture, and reference flag information indicating whether each picture was inter-layer predicted, to a predetermined data unit including encoding information of the texture pictures and depth map pictures of the multiview image related to the same point of time. As described above, the view information view_id[i] 2120 of the picture that is ith encoded, and the flag (depth_flag[i]) 2130 indicating whether the ith encoded picture is the depth map picture are added to the AU delimiter. Also, if the ith encoded picture is the depth map picture, the output unit 1620 adds, to the AU delimiter, the reference flag information (texture_to_depth_dependent_flag 2140) indicating whether the ith encoded picture was inter-layer predicted by referring to a previous texture picture. If the ith encoded picture is the texture picture, the output unit 1620 adds, to the AU delimiter, the reference flag information (depth_to_texture_dependent_flag 2150) indicating whether the ith encoded picture was inter-layer predicted by referring to a previous depth map picture.

Figure 23:
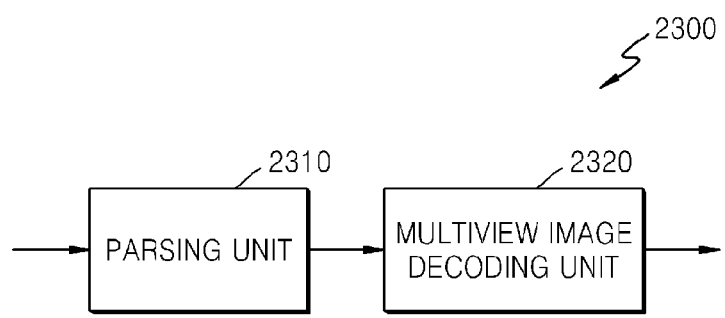
FIG. 23 is a block diagram of a multiview video decoding apparatus, according to an exemplary embodiment.

FIG. 23 is a block diagram of a multiview video decoding apparatus, according to an exemplary embodiment.

Referring to FIG. 23, a multiview video decoding apparatus 2300 includes a parsing unit 2310 (e.g., parser) and a multiview image decoding unit 2320 (e.g., multiview image decoder).

The parsing unit 2310 obtains, from a predetermined data unit of a bitstream, view information of each of the pictures that are encoded and are included in a data unit, type information indicating a type of each picture from among a texture picture and a depth map picture, and reference flag information indicating whether each picture was inter-layer predicted by referring to a texture picture of a same point of time or to a depth map picture of the same point of time, wherein the predetermined data unit includes encoding information of texture pictures and depth map pictures of a multiview image related to the same point of time.

As described above, the parsing unit 2310 may obtain, from the AU delimiter, the view information view_id[i] 2120 of the picture that is ith included in a current access unit, and the flag (depth_flag[i] 2130) indicating whether the ith encoded picture is the depth map picture. If the ith encoded picture is the depth map picture, the reference flag information (texture_to_depth_dependent_flag 2140) indicating whether the ith encoded picture was inter-layer predicted by referring to a previous texture picture may be obtained from the AU delimiter. If the ith encoded picture is the texture picture, the reference flag information (depth_to_texture_dependent_flag 2150) indicating whether the ith encoded picture was inter-layer predicted by referring to a previous depth map picture may be obtained from the AU delimiter. Also, the parsing unit 2310 may obtain a flag (picture_coding_order_update_flag 2010) indicating whether to update an encoding order of pictures that are included in the current access unit. If the flag (picture_coding_order_update_flag 2120) indicates 0, the encoding order of the current access unit is determined by using an encoding order included in a previous access unit. If the flag (picture_ coding_order_update_flag 2120) indicates 1, the encoding order of the current access unit is determined without using the encoding order included in the previous access unit but is determined by using the view information of each picture, the type information indicating the type of each picture from among the texture picture and the depth map picture, and the reference flag information indicating whether each picture was inter-layer predicted by referring to a texture picture of the same point of time or to a depth map picture of the same point of time, which are separately transmitted via picture_coding_order_update( ).

The multiview image decoding unit 2320 determines an encoding order of the pictures included in the data unit, based on the view information, the type information, and the reference flag information of each picture, and decodes the texture pictures and the depth map pictures of the multiview image related to the same point of time.

Figure 24:
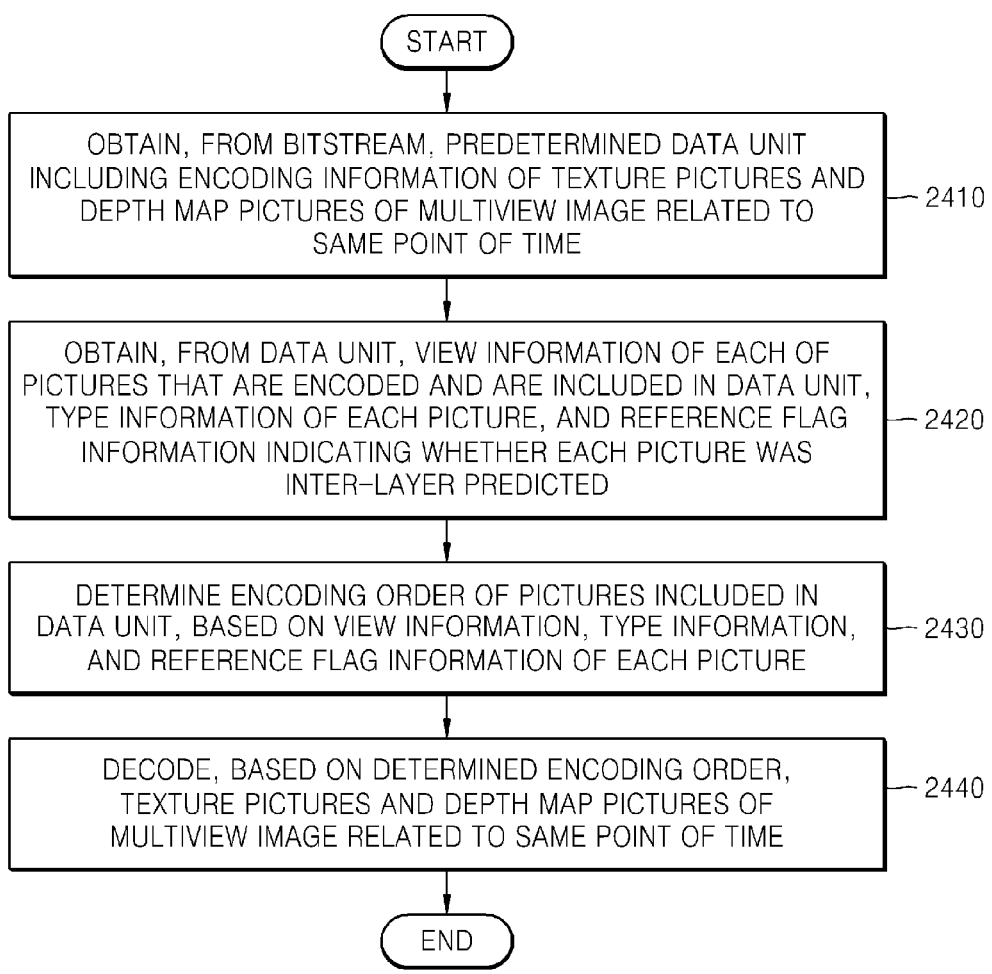
FIG. 24 is a flowchart of a method of decoding a multi-view video, according to an exemplary embodiment.

FIG. 24 is a flowchart of a method of decoding a multiview video, according to an exemplary embodiment.

Referring to FIG. 24, in operation 2410, the parsing unit 2310 obtains, from a bitstream, a predetermined data unit including encoding information of texture pictures and depth map pictures of a multiview image related to a same point of time. As described above, the predetermined data unit may be an access unit.

In operation 2420, the parsing unit 2310 obtains, from the data unit, view information of each of the pictures that are encoded and are included in the data unit, type information indicating a type of each picture from among the texture picture and the depth map picture, and reference flag information indicating whether each picture was inter-layer predicted by referring to a texture picture of the same point of time or to a depth map picture of the same point of time.

In operation 2430, the multiview image decoding unit 2320 determines an encoding order of the pictures included in the data unit, based on the view information, the type information, and the reference flag information of each picture. The parsing unit 2310 may obtain a flag (picture_coding_order_update_flag 2010) indicating whether to update the encoding order of the pictures included in the current access unit. If picture_coding_order_update_flag 2010 indicates 0, the encoding order of the pictures included in the current access unit is determined by using an encoding order of pictures included in a previous access unit. If picture_coding_order_update_flag 2010 indicates 1, the encoding order of the pictures included in the current access unit is determined without using the encoding order of the pictures included in the previous access unit but is determined by using the view information of each picture, the type information indicating the type of each picture from among the texture picture and the depth map picture, and the reference flag information indicating whether each picture was inter-layer predicted by referring to a texture picture of the same point of time or to a depth map picture of the same point of time, which are separately transmitted via picture_coding_order_update( ). That is, the encoding order of the pictures included in the current access unit may be determined by determining the view information and the type information of each of the pictures that are sequentially encoded and are included in the current access unit.

In operation 2440, the multiview image decoding unit 2320 decodes, based on the determined encoding order, the texture pictures and the depth map pictures of the multiview image related to the same point of time.

The exemplary embodiments may be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the exemplary embodiments have been particularly shown and described with reference to exemplary embodiments thereof, it will be understood by those of ordinary skill in the art that various changes in form and details may be made therein without departing from the spirit and scope of the exemplary embodiments as defined by the appended claims. The exemplary embodiments should be considered in a descriptive sense only and not for purposes of limitation. Therefore, the scope of the exemplary embodiments is defined not by the detailed description but by the appended claims, and all differences within the scope will be construed as being included in the exemplary embodiments.

What is claimed is:

1. A method of decoding a multiview video, the method comprising:
    obtaining, from a bitstream, a data unit comprising encoding information of texture pictures and depth map pictures of a multiview image, the texture pictures and the depth map pictures being related to a same point of time;
    obtaining, from the data unit, view information of pictures that are encoded and are comprised in the data unit, type information indicating a type of each of the pictures from among the texture pictures and the depth map pictures, and reference flag information indicating whether each of the pictures is previously inter-layer predicted by referring to a texture picture of the same point of time or to a depth map picture of the same point of time;
    determining an encoding order of the pictures comprised in the data unit, based on the view information, the type information, and the reference flag information of each of the pictures; and
    decoding the texture pictures and the depth map pictures, based on the determined encoding order,
    wherein the type information is flag information that indicates whether each of the pictures is the depth map picture, and
    if each of the pictures is the depth map picture, the obtaining of the reference flag information comprises obtaining the reference flag information indicating whether each of the pictures is previously inter-layer predicted by referring to a texture picture of the same point of time, and if each of the pictures is the texture picture, the obtaining of the reference flag information comprises obtaining the reference flag information indicating whether each of the pictures is previously inter-layer predicted by referring to a depth map picture of the same point of time.

2. The method of claim 1, further comprising obtaining, from the data unit, update flag information indicating whether to update the encoding order of the pictures comprised in the data unit, and
    wherein, when the update flag information indicates to update the encoding order of the pictures comprised in the data unit, the determining of the encoding order of the pictures comprised in the data unit comprises determining the encoding order of the pictures comprised in the data unit, based on the view information, the type information, and the reference flag information of each of the pictures, and
    when the update flag information indicates not to update the encoding order of the pictures comprised in the data unit, determining the encoding order of the pictures comprised in the data unit, based on an encoding order that is determined in a previous data unit previous to the data unit.

3. The method of claim 1, wherein the data unit is an access unit.

4. The method of claim 1, wherein the texture pictures and the depth map pictures of the multiview image are encoded based on coding units of a tree structure that are obtained by hierarchically splitting a maximum coding unit.

5. The method of claim 1, wherein the texture pictures and the depth map pictures of the multiview image related to the same point of time have a same picture order count (POC).

6. A multiview video decoding apparatus, comprising:
    at least one processor; and
    a memory storing a program which causes the at least one processor to:
        obtain, from a bitstream, a data unit comprising encoding information of texture pictures and depth map pictures of a multiview image, the texture pictures and the depth map pictures being related to a same point of time, and to obtain, from the data unit, view information of pictures that are encoded and are comprised in the data unit, type information indicating a type of each of the pictures from among the texture pictures and the depth map pictures, and reference flag information indicating whether each of the pictures is previously inter-layer predicted by referring to a texture picture of the same point of time or to a depth map picture of the same point of time; and determine an encoding order of the pictures comprised in the data unit, based on the view information, the type information, and the reference flag information of each of the pictures, and to decode the texture pictures and the depth map pictures, based on the determined encoding order, wherein the type information is flag information that indicates whether each of the pictures is the depth map picture, and wherein, if each of the pictures is the depth map picture, the at least one processor is configured to obtain the reference flag information indicating whether each of the pictures is previously inter-layer predicted by referring to a texture picture of the same point of time, and if each of the pictures is a texture picture, the at least one processor is configured to obtain the reference flag information indicating whether each of the pictures is previously inter-layer predicted by referring to a depth map picture of the same point of time.

7. The multiview video decoding apparatus of claim 6, wherein the at least one processor is configured to obtain, from the data unit, update flag information indicating whether to update the encoding order of the pictures comprised in the data unit, and wherein, when the update flag information indicates to update the encoding order of the pictures comprised in the data unit, the at least one processor is configured to determine the encoding order of the pictures comprised in the data unit, based on the view information, the type information, and the reference flag information of each of the pictures, and when the update flag information indicates not to update the encoding order of the pictures comprised in the data unit, the at least one processor is configured to determine the encoding order of the pictures comprised in the data unit, based on an encoding order that is previously determined in a previous data unit previous to the data unit.

8. The multiview video decoding apparatus of claim 6, wherein the data unit is an access unit.

9. The multiview video decoding apparatus of claim 6, wherein the texture pictures and the depth map pictures of the multiview image are pictures that are encoded based on coding units of a tree structure that are obtained by hierarchically splitting a maximum coding unit.

10. The multiview video decoding apparatus of claim 6, wherein the texture pictures and the depth map pictures of the multiview image related to the same point of time have a same picture order count (POC).

11. A non-transitory computer-readable recording medium having recorded thereon a program for executing the method of decoding a multiview video of claim 1.

* * * * *